US 9,338,772 B2

(12) United States Patent
Etemad

(10) Patent No.: US 9,338,772 B2
(45) Date of Patent: *May 10, 2016

(54) CONFIGURING COMPONENT CARRIERS IN CARRIER AGGREGATION

(75) Inventor: Kamran Etemad, Potomac, MD (US)

(73) Assignee: INTEL CORPORATION, Santa Clara, CA (US)

( * ) Notice: Subject to any disclaimer, the term of this patent is extended or adjusted under 35 U.S.C. 154(b) by 205 days.

This patent is subject to a terminal disclaimer.

(21) Appl. No.: 13/299,800

(22) Filed: Nov. 18, 2011

(65) Prior Publication Data

US 2012/0063358 A1 Mar. 15, 2012

Related U.S. Application Data

(63) Continuation of application No. 12/975,725, filed on Dec. 22, 2010, now Pat. No. 8,537,718.

(60) Provisional application No. 61/330,837, filed on May 3, 2010.

(51) Int. Cl.
H04W 36/22 (2009.01)
H04W 72/04 (2009.01)
(Continued)

(52) U.S. Cl.
CPC ............. *H04W 72/042* (2013.01); *H04L 5/001* (2013.01); *H04L 5/003* (2013.01); *H04L 5/0032* (2013.01);
(Continued)

(58) Field of Classification Search
CPC ...... Y02B 60/50; H04L 5/0007; H04L 5/001; H04L 5/0039; H04L 5/0055; H04L 5/0064; H04L 5/0082; H04L 5/0092; H04L 5/0094; H04L 5/0096; H04L 5/0098; H04W 24/00; H04W 24/02; H04W 24/10; H04W 28/06
USPC ........................... 370/254–350; 709/201–213
See application file for complete search history.

(56) References Cited

U.S. PATENT DOCUMENTS 8,305,986 B2 11/2012 Zhang et al.
8,331,401 B2 12/2012 Yang et al.
(Continued)

FOREIGN PATENT DOCUMENTS

CN 101379723 A 3/2009
CN 101674586 A 3/2010
(Continued)

OTHER PUBLICATIONS

European Search report received for European Patent Application No. 11163124.8, mailed on Oct. 31, 2013, 7 Pages.
(Continued)

Primary Examiner — Ayaz Sheikh
Assistant Examiner — Debebe Asefa
(74) Attorney, Agent, or Firm — Thorpe North & Western LLP

(57) ABSTRACT

A system and method for configuring component carriers in carrier aggregation is disclosed. The method comprises communicating a carrier aggregation capability for a selected UE to an enhanced Node B (eNode B) configured to provide service for a plurality of UEs. A plurality of component carriers at the eNode B can be configured for the selected UE based on the carrier aggregation capability of the selected UE. A component carrier configuration message is broadcast from the eNode B containing component carrier configuration information that is common to the plurality of UEs. Specific configuration information that is specific to the selected UE is communicated using dedicated communication signaling. Selected configured component carriers are then activated by the eNode B for the selected UE. Activation can be based on the UE's quality of service needs, bandwidth needs, and strength of signal for the component carriers.

25 Claims, 7 Drawing Sheets

(51) Int. Cl.
    H04L 5/00      (2006.01)
    H04L 12/835    (2013.01)
    H04L 12/851    (2013.01)
    H04L 12/801    (2013.01)
    H04W 28/12     (2009.01)
    H04L 12/841    (2013.01)

(52) U.S. Cl.
    CPC ............ *H04L 5/0053* (2013.01); *H04L 5/0064* (2013.01); *H04L 5/0094* (2013.01); *H04L 47/11* (2013.01); *H04L 47/14* (2013.01); *H04L 47/283* (2013.01); *H04L 47/30* (2013.01); *H04W 28/12* (2013.01); *H04W 72/0406* (2013.01); *H04W 36/22* (2013.01); *H04W 72/0486* (2013.01); *Y02B 60/43* (2013.01)

(56) References Cited

U.S. PATENT DOCUMENTS

| | | | |
|---|---|---|---|
| 8,428,066 B2* | 4/2013 | Guo | 370/395.2 |
| 8,432,859 B2* | 4/2013 | Lee et al. | 370/329 |
| 8,605,616 B2* | 12/2013 | Yamada et al. | 370/252 |
| 8,606,257 B2* | 12/2013 | Li | 455/422.1 |
| 2008/0267269 A1 | 10/2008 | Enescu et al. | |
| 2010/0178895 A1* | 7/2010 | Maeda et al. | 455/404.1 |
| 2010/0227569 A1* | 9/2010 | Bala et al. | 455/73 |
| 2011/0134774 A1 | 6/2011 | Kishiyama et al. | |
| 2011/0194515 A1 | 8/2011 | Nakao et al. | |
| 2011/0243106 A1* | 10/2011 | Hsu et al. | 370/336 |
| 2011/0274057 A1 | 11/2011 | Kuo | |

FOREIGN PATENT DOCUMENTS

| | | |
|---|---|---|
| CN | 102238692 A | 11/2011 |
| EP | 2385653 A2 | 9/2011 |
| JP | 2009524976 A | 7/2009 |
| JP | 2009-267989 A | 11/2009 |
| JP | 2010-074754 A | 4/2010 |
| JP | 2012015992 A | 1/2012 |
| WO | 2009/154540 A1 | 12/2009 |
| WO | 2010/016274 A1 | 2/2010 |
| WO | 2010016222 A1 | 2/2010 |

OTHER PUBLICATIONS

Office Action received for Chinese Patent Application No. 201110125116.4, mailed on Jul. 23, 2013, 21 pages of Office Action Including 13 pages of English Translation.

Huawei "Carrier segments" 3GPP RAN WG1 Meeting #59 bis R1-100238, Valencia, Spain, Jan. 18-22, 2010, 6 Pages.

LG, Electronics, "UE-specific Carrier Assignment for LTE-Advanced" 3GPP Draft; R1-092126, 3rd Generation Partnership Project (3GPP), Mobile Competence Centre ; 650, Route Des Lucioles; F-06921 Sophia-Antipolis Cedex; France, No. San Francisco, USA; 20090428, Apr. 28, 2009.

Zte, "Downlink control structure for LTE-A" 3GPP TSG-RAN WG1 meeting #56, Feb. 9-13, 2009, Athens, Greece, 5 Pages.

Notice of Allowability received for U.S. Appl. No. 12/975,725, mailed on Jun. 5, 2013, 9 Pages.

Notice of Allowance received for U.S. Appl. No. 13/299,765, mailed on Jan. 27, 2014, 9 Pages.

Notice of Allowance received for Chinese Patent Application No. 201110125116.4, mailed on Apr. 11, 2014, 2 Pages of Office Action and 2 Pages of English Translation.

Office Action received for Japanese Patent Application No. 2013-142951, mailed on Jun. 10, 2014, 2 pages of Office Action and 2 pages of English Translation.

Ericsson, "Linking of UL and DL PCCs", 3GPP TSG-RAN WG2 #69bis, Tdoc R2-102067, Apr. 12-16, 2010, 3 Pages.

Panasonic, "MAC Control Element for Component Carrier Management", 3GPP TSG-RAN WG2 Meeting #69bis, R2-102520, Apr. 12-16, 2010, 3 Pages.

Final Office Action received for U.S. Appl. No. 12/975,725, mailed on Jan. 14, 2013, 20 pages.

Non Final Office Action Received for the U.S. Appl. No. 12/975,725, mailed on Sep. 10, 2012, 17 pages.

Office Action received for Japanese patent application No. 2011-088896 mailed on Sep. 11, 2012, 4 pages of Office Action and 2 pages of English translation.

'Consideration on Component Carrier Index', 3GPP TSG RAN WG2 Meeting #69, R2-101051, San Francisco, USA, Feb. 22-26, 2010, pp. 1-3.

Notice of Allowance received for U.S. Appl. No. 12/975,725 , mailed on Jul. 2, 2013, 9 pages.

Notice of Allowance received for U.S. Appl. No. 12/975,725,mailed on May 20, 2013, 13 pages.

Notice of Allowance received for Japan Patent Application No. 2011-088896, mailed on May 14, 2013, 1 page of Office Action only.

Non Final Office Action received for U.S. Appl. No. 13/299,765, mailed on May 24, 2013, 21 pages.

Office Action received for U.S. Appl. No. 13/299,765 mailed on May 24, 2013.

* cited by examiner

CONFIGURING COMPONENT CARRIERS IN CARRIER AGGREGATION

CLAIM OF PRIORITY

This is a continuation of U.S. patent application Ser. No. 12/975,725, filed on Dec. 22, 2010 which claims priority to U.S. Provisional patent application Ser. No. 61/330,837 filed on May 3, 2010.

BACKGROUND

The use of wireless communication devices continues to become more ubiquitous in modern societies. The substantial increase in the use of wireless devices is driven, in part, by the devices' increasing abilities. While wireless devices were once used only to communicate voice and text, their ability to display audiovisual presentations has driven the need to be able to transmit and receive pictures, information related to games, television, movies, and so forth.

One way of increasing the amount of data that can be communicated is through the use of carrier aggregation. Carriers are signals in permitted frequency domains onto which information is placed. The amount of information that can be placed on a carrier is determined by the carrier's bandwidth. The permitted frequency domains are often limited in bandwidth. The bandwidth limitations become more severe when a large number of users are simultaneously using the bandwidth in the permitted frequency domains.

Carrier aggregation enables multiple carrier signals to be simultaneously communicated between a user's wireless device and a base station. Multiple different carriers can be used. In some instances, the carriers may be from different permitted frequency domains. This provides a broader choice to the wireless devices, enabling more bandwidth to be obtained. The greater bandwidth can be used to communicate bandwidth intensive operations, such as streaming video or large data files.

Various wireless standards have been drafted that enable wireless communication devices to be interoperable. However, the wireless standards are not complete in defining the information that needs to be exchanged between wireless devices and base stations to allow carrier aggregation to take place in a mobile wireless communication system.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

DEFINITIONS

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter. The following definitions are provided for clarity of the overview and embodiments described below.

Figure 1A:
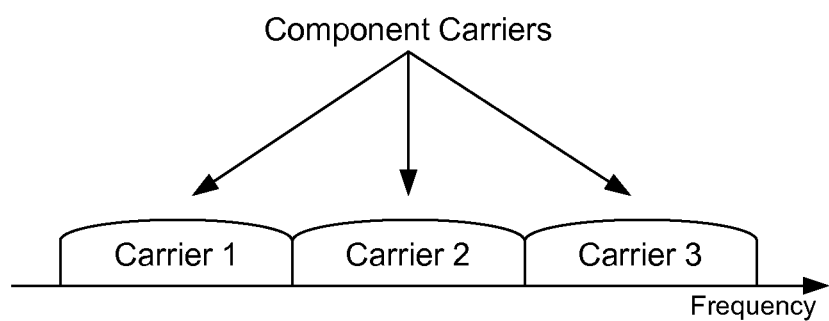
FIG. 1a illustrates carrier aggregation of continuous component carriers in accordance with an example.

FIG. 1a illustrates an example of carrier aggregation of continuous carriers. In the example, three carriers are contiguously located along a frequency band. Each carrier can be referred to as a component carrier. In a continuous type of system, the component carriers are located adjacent one another and are typically located within a single frequency band. A frequency band is a selected frequency range in the electromagnetic spectrum. Selected frequency bands are designated for use with wireless communications such as wireless telephony. Certain frequency bands are owned or leased by a wireless service provider. Each adjacent component carrier may have the same bandwidth, or different bandwidths. A bandwidth is a selected portion of the frequency band. Wireless telephony has traditionally been conducted within a single frequency band.

Figure 1B:
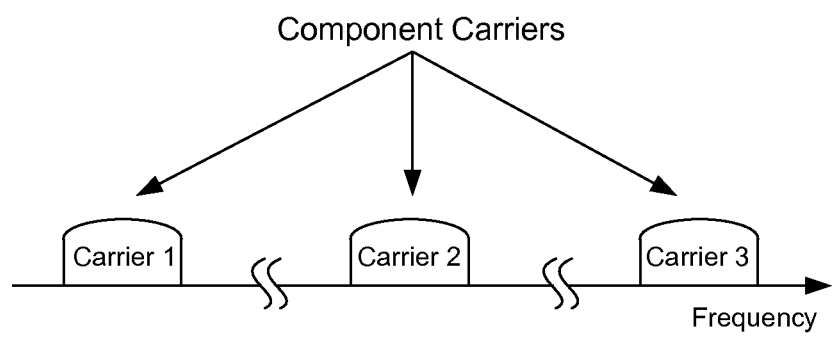
FIG. 1b illustrates carrier aggregation of non-continuous component carriers in accordance with an example.

FIG. 1b illustrates an example of carrier aggregation of non-continuous component carriers. The non-continuous component carriers may be separated along the frequency range. Each component carrier may even be located in different frequency bands. The ability to use component carriers in different frequency bands enables greater communication speeds and more efficient use of available bandwidth.

In existing spectrum allocation policies and the relatively narrow frequency bands that are currently available for wireless telephony, it can be difficult to allocate continuous large bandwidths, such as bandwidths of 100 MHz. The use of carrier aggregation enables multiple different carriers to be combined to enable greater bandwidths to be used to increase wireless communication speeds.

Wireless mobile communication technology uses various standards and protocols to transmit data between a base transceiver station (BTS) and a wireless mobile device. In the third generation partnership project (3GPP) long term evolution (LTE) standard, the BTS is a combination of evolved Node Bs (eNode Bs or eNBs) and Radio Network Controllers (RNCs) in a Universal Terrestrial Radio Access Network (UTRAN), which communicates with the wireless mobile device, known as a user equipment (UE). Data is transmitted from the eNode B to the UE via a physical downlink shared channel (PDSCH). As a UE changes positions (i.e. moves), the UE can be moved from one eNode B to another. The process of moving between nodes is typically referred to as handover. The handover process typically occurs in a seamless fashion so that a user does not even realize it occurs. The eNode B that provides communication services, such as the PDSCH, to a UE is referred to as the serving eNode B.

While the terminology of the 3GPP LTE standard is used throughout this specification, it is not intended to be limiting. A UE configured to communicate with an eNode B is considered to be synonymous with a generic radio frequency mobile communication device configured to communicate with a base station, unless otherwise noted.

Figure 2:
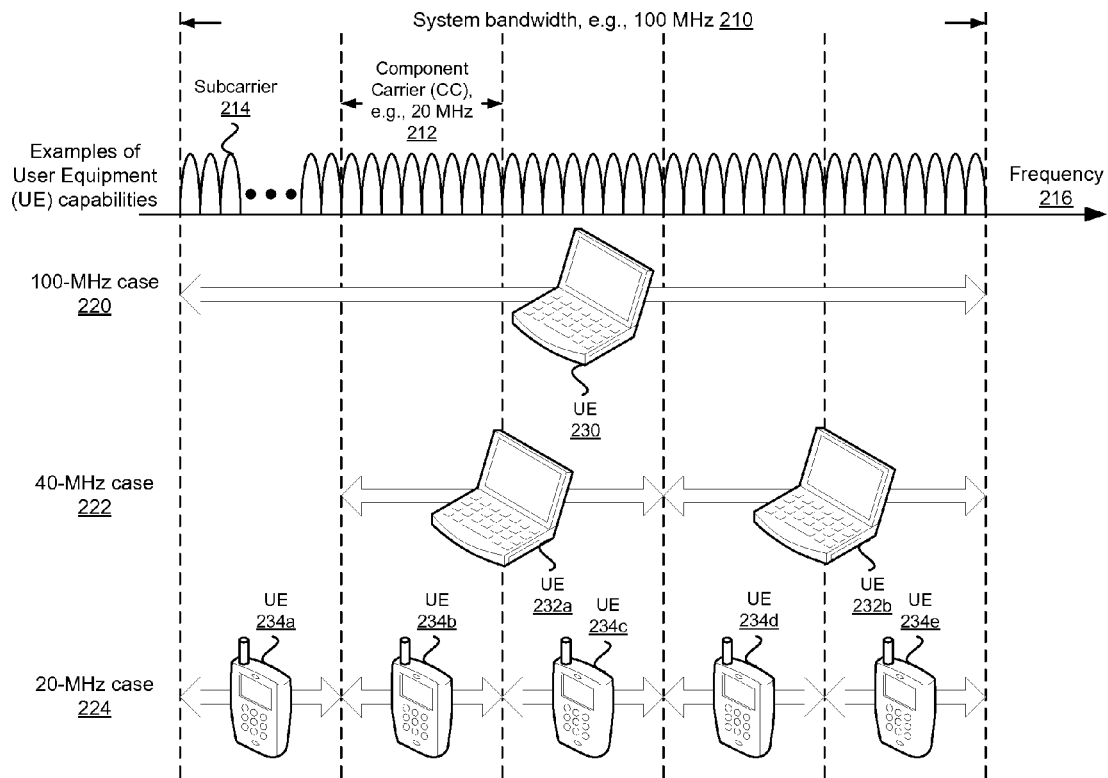
FIG. 2 illustrates a block diagram of carrier aggregation in accordance with an example.

In one embodiment of carrier aggregation (CA) in the 3GPP LTE standard, component carriers (CCs) for a Universal Mobile Telecommunications System (UMTS) Terrestrial Radio Access Network can be combined together to form a larger bandwidth for the UE, as illustrated in FIG. 2. For example, the UMTS may have a system bandwidth 210 of 100 MHz in a frequency spectrum 216 with each CC 212 having a 20 MHz bandwidth. Each CC may comprise a plurality of subcarriers 214. Some UEs 230 may use the entire 100 MHz system bandwidth by aggregating five 20 MHz CCs together to achieve a 100 MHz UE bandwidth 220.

In another example, two UEs 232a and 232b, each with a 40 MHz bandwidth capability, may each use two 20 MHz CCs together to achieve a 40 MHz UE bandwidth 222 for each UE. In another example, each UE 234a, 234b, 234c, 234d, and 234e may use a single 20 MHz CC to achieve a 20 MHz UE bandwidth 224. The CCs at an eNode B may be aggregated for some UEs while other UEs may use a single CC during the same interval. For example, one UE with a 40 MHz bandwidth may be configured while three UEs that each use a single 20 MHz CC are employed in a 100 MHz bandwidth system (not shown). Carrier aggregation allows the bandwidth for a UE to be adjusted and adapted by an eNode B based on the wireless communication system's limitations, the UEs capabilities and bandwidth requirements, the bandwidth available to the system and/or loading of other UEs on the system.

Figure 3:
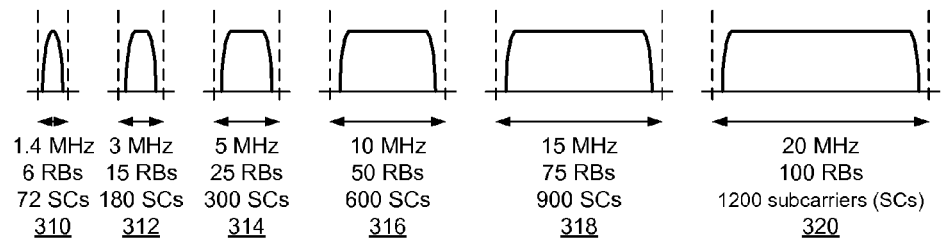
FIG. 3 illustrates a block diagram of component carrier (CC) bandwidths in accordance with an example.

Each UMTS may use a different carrier bandwidth, as illustrated in FIG. 3. For example, the 3GPP LTE Release 8 (Rel-8) carrier bandwidths and Release 10 (Rel-10) CC bandwidths can include: 1.4 MHz 310, 3 MHz 312, 5 MHz 314, 10 MHz 316, 15 MHz 318, and 20 MHz 320. The 1.4 MHz CC can include 6 Resource Blocks (RBs) comprising 72 subcarriers. Each RB can include twelve 15 kHz subcarriers (on the frequency axis) and 6 or 7 orthogonal frequency-division multiplexing (OFDM) symbols per subcarrier. The 3 MHz CC can include 15 RBs comprising 180 subcarriers. The 5 MHz CC can include 25 RBs comprising 300 subcarriers. The 10 MHz CC can include 50 RBs comprising 600 subcarriers. The 15 MHz CC can include 75 RBs comprising 900 subcarriers. The 20 MHz CC can include 100 RBs comprising 1200 subcarriers. These examples are not intended to be limiting. Carrier aggregation can be accomplished using additional schemes with different bandwidths and different numbers of subcarriers in each CC.

Each eNode B can have a plurality of different carriers. For instance, the eNode B may have five separate carriers. Each carrier can have a specific bandwidth and center frequency. The carriers may be located in the same frequency band or different frequency bands.

In one embodiment, an eNode B can be configured to broadcast or unicast information regarding its available carriers. For instance, information may be communicated using Radio Resource Control (RRC) signaling regardless of the carrier aggregation support of each UE being served by the eNode B. RRC signaling is defined in Release 8 and further defined in Release 9 of the 3GPP LTE Standard, though use of the term is intended to be inclusive of future standards releases as well.

Each available carrier for an eNode B may be assigned an eNode B specific carrier index (eNB CI) by the eNode B. That is, the CI is specific to the eNode B. If a UE is handed over to another eNode B, a new eNB CI will be assigned that eNode B. The eNB CI can be used for future referencing by the eNode B.

If the information about available carriers is static and the same across a network then the information can be provided to the UE following network entry and during provisioning of the UE. During network entry, the UE can provide the eNode B with its carrier aggregation capabilities. The UE's carrier aggregation capabilities include a maximum number of carriers that can be accepted. The maximum number of carriers can be defined for both the uplink (UL) and the downlink (DL). In one embodiment, the UE may be configured to accept the same number of uplink and downlink component carriers. Alternatively, a greater number of UL or DL CCs may be applied. For instance, the UE may be configured to use 3 UL CCs and 5 DL CCs.

The capabilities of the UE can also include the bandwidth of each carrier that the UE is capable of accepting. As previously discussed, carriers with a number of different bandwidths may be used by the eNode B. The UE can also communicate to the eNode B which different frequency band classes are supported. For example, Global System for Mobile Communications (GSM) compatible phones may operate at frequency bands with center frequencies at 380, 410, 450, 480, 710, 750, 810, 850, 900, 1800 and 1900 MHz. Universal Mobile Telecommunications System (UMTS) compatible phones may operate at 700, 800, 850, 900, 1500, 1700, 1800, 1900, 2100, and 2600 MHz when using frequency division duplexing (FDD). Other types of mobile phones can operate at additional frequencies and frequency bands, as can be appreciated. Each country typically specifies which bands may be used within the country for mobile telephony.

The information about each UE's capabilities can be maintained and provided to the serving eNode B during network entry or as part of RRC level carrier configuration messaging when such configuration is initiated by the eNode B.

Primary Component Carrier

When a UE that is configured to operate in a manner that is consistent with the 3GPP LTE Rel 8/9 procedures is powered on then the UE is typically configured to scan, select, and attach to one of the available carriers provided by an eNode B. It can be assumed that all RRC-IDLE mode procedures are handled by each UE consistent with the 3GPP LTE Rel 8/9 procedures as well.

The carrier selected by the UE for attachment to the eNode B can be considered the initial and default carrier, referred to herein as the Primary Component Carrier (PCC). All other carriers used by the eNode B can be referred to as Secondary Component Carriers (SCC). A UE's PCC may be changed for a variety of purposes. For instance, the PCC may be changed due to load balancing, interference management, or other link level preferences. The change can be effected through the use of RRC level carrier configuration updates without using network level signaling.

The PCC can carry system information such as paging and RRC messaging for each UE's state and mobility management. The information may be broadcast or unicast. In one embodiment, the system information can be exchanged between the eNode B and each UE consistent with 3GPP LTE Rel 8/9 procedures. The RRC messages to each UE can be sent to the UE through other active carriers if the messages are part of the physical downlink control channel (PDCCH) information. A physical downlink control channel (PDCCH) is used to transfer downlink control information (DCI) that informs the UE about resource allocations or scheduling related to downlink resource assignments on the PDSCH, uplink resource grants, and uplink power control commands. The PDCCH can be transmitted prior to the PDSCH in each subframe transmitted from the eNode B to the UE.

The PCC can be configured and activated by default. The carrier that is selected by the UE for attachment to the eNode B at power up can be designated as the PCC. The PCC can remain activated while the UE is in an RRC-Connected mode. The PCC can be changed dynamically for purposes such as load balancing, interference, link optimization, and so forth. A change in the PCC can be initiated by the eNode B or requested by the UE. The change in PCC is not specifically discussed in the 3GPP LTE Rel 8/9 versions of the standard.

In one embodiment, a security key update for a PCC change can be implemented. For instance, the PCC change can follow a handover procedure such as the procedure laid out in the 3GPP Rel 8/9. The PCC change can be carried out in a manner that enables the change to be substantially transparent to upper layers of the network.

The PCC can be comprised of a downlink portion and an uplink portion. The DL PCC can be paired with an UL CC that carries the random access channel (RACH) and the physical uplink control channel (PUCCH) associated with the CCs for each active downlink. Alternatively, other carriers of the eNode B can be configured to carry additional RACH's or PUCCH's based on the services needed by the UE and based on the UE's capabilities.

Carrier Configuration/Reconfiguration

In one embodiment, an eNode B that is configured to support carrier aggregation can provide an attached UE with scheduling information (SI) about alternative (secondary) component carriers in that eNode B using a high level signaling mechanism such as RRC signaling or another type of layer two or layer three signaling. The eNode B can communicate configuration information about each component carrier to the UEs that are being served by the eNode B. When the UE receives this information, each alternative component carrier can be treated as a configured component carrier. This enables the UE to quickly activate configured component carriers. The configured component carrier's resources can be scheduled for carrier aggregation as needed. The carrier configuration information can be valid within an eNode B. Component Carriers are typically configured as DL and UL component carrier pairs. Each component carrier pair, and its corresponding resources, can be referred to as a serving cell for the UE. Thus, component carrier configuration may also be considered as cell configuration.

In one embodiment, carrier configuration information can be extended to be changed for another eNode B during handover procedures. A next eNode B can be referred to as a target eNode B. The component carrier configuration information can be communicated to the target eNode B as part of component carrier pre-configuration, which may be integrated with handover signaling.

The component carrier configuration information can include radio layer information for the uplink and downlink for each component carrier (cell). For example, the information can include details regarding the UL and DL component carriers' center frequency, bandwidth, duplex mode, and eNode B specific carrier index. The duplex mode may be time division duplex (TDD) or frequency division duplex (FDD). In addition, the duplex mode may be different for a component carrier's UL and DL. For instance, the UL may have a TDD duplex mode, while the downlink may have an FDD duplex mode, and vice versa.

The component carrier configuration information may be broadcast or sent through dedicated RRC signaling by the eNode B. To reduce the signaling overhead used for subsequent reconfiguration and activation or deactivation, each configured carrier can also be assigned a UE specific configured physical carrier index (CI). The UE specific CI can be used for subsequent references to that carrier in future layer 2 or layer 3 messaging, such as RRC signaling.

In one embodiment, the eNode B can be configured to broadcast component carrier information that is common to a plurality of the UEs served by the eNode B. Alternatively, broadcasting of component carrier configuration information may only be done when the information applies to all of the UEs served by the eNode B. Component carrier information that is UE specific can be communicated using dedicated radio resource communication signaling, such as RRC signaling or another type of unicast signaling. For instance, information such as a component carrier's center frequency, the carrier's bandwidth, and the carrier's eNode B specific CI is the same for all UEs served by the eNode B. This information can be broadcast by the eNode B. The ability to broadcast this information can significantly reduce signaling overhead. UE specific information, such as the duplex mode for a specific UL or DL, and a UE specific configured physical carrier index for a component carrier can be communicated to the desired UE using RRC signaling or another form of layer 2 or layer 3 signaling.

Once carriers are configured, they can be selected by the eNode B for a UE based on the UE's capabilities. For instance, the eNode B can take into account the number of component carriers for both uplink and downlink that the UE can support, the maximum bandwidth the UE can support, the frequency bands the UE is capable of operating in, and so forth.

The carrier configuration may be deferred until wireless service between a specific UE and the eNode B requires or benefits from carrier aggregation. This determination can be made by the eNode B based on the UE's communication needs. The UE's communication needs can be based on information such as the desired Quality of Service (QoS), bandwidth needs, and so forth.

One or more component carriers that are configured for a specific UE can have its configuration changed in a process referred to as carrier reconfiguration. Carrier reconfiguration is an RRC procedure to change one or more of the configured carriers and/or a parameter of a configured carrier in the specific UE's set of configured component carriers.

Once the carriers have been configured for a specific UE, and before the configured carriers have been assigned to the UE by the eNode B, the specific UE can perform signal strength measurements for each configured component carrier between the UE and the eNode B. In one embodiment, the measurements can be similar to mobility based measurements. The threshold for triggering such measurements may be specifically defined for a configured component carrier set management by the eNode B.

In one embodiment, the measurements may be radio resource management (RRM) type measurements. The RRM measurements may be a reference symbol received power (RSRP) measurement, a reference symbol received quality (RSSQ) measurement, a carrier received signal strength indicator (RSSI) measurement, or another type of measurement operable to provide an averaged measurement of the link quality. In one embodiment, the RRM measurements may be averaged for approximately 200 milliseconds to reduce the effects of rapid changes in the component carrier signals. The set of configured carriers for the specific UE can be determined and dynamically managed through RRC signaling based on the UE's capabilities and signal strength measurement reports from the specific UE to the eNode B for each configured component carrier.

Carrier Pairing/Linking and Control Channel Mapping

Component carrier configuration also includes information about DL/UL paring as well as DL/UL control channel mapping and relevance across the component carriers.

Each configured component carrier can include a DL CC paired with a corresponding UL CC. In one embodiment, the default pairing between each DL CC and the corresponding UL CC can be based on the 3GPP LTE Release 8/9 standards and reflected in System Information Block (SIB) messaging. However, such pairing may be changed as part of the CC configuration for a specific UE. For example, DL/UL paring options can support many-to-one DL to UL configurations and many-to-one UL to DL configurations. For each configured carrier pair, the carrier for which the PDCCH is transmitted can also be defined.

There can be two PDCCH mapping/monitoring options. In one embodiment, for each active DL CC, the carrier on which the corresponding PDCCH is transmitted is explicitly defined during the RRC CA configuration process. The definition can apply in all subsequent scheduling, activation and deactivation. Such cross carrier PDCCH mapping configuration may be changed if needed through a CC reconfiguration procedure.

In another embodiment, for each active DL or UL CC, the PDCCH carrying the DL/UL scheduling information is either transmitted on the same CC or the PCC, as specified in the RRC CA configuration process.

In either embodiment, the UE can know, following configuration, on which activated carrier it should monitor the PDCCH. This enables the UE to reduce the number of carriers on which blind detection of the PDCCH is required, thereby reducing the time and processing power needed to determine the DCI at the UE.

Similarly, two different options are available for feedback channel mapping. In one embodiment, for each PDSCH transmission the PUCCH carrying feedback information can be transmitted on the UL CC that is paired with the DL CC carrying the corresponding PDCCH.

In another embodiment, the PUCCH for all PDSCH transmissions on all DL active CCs is transmitted on the UL CC associated with the PCC. This embodiment can be preferred for cases in which the UE may not have multiple UL CCs and/or when transmission on multiple UL CCs would impact link level performance.

Figure 4A:
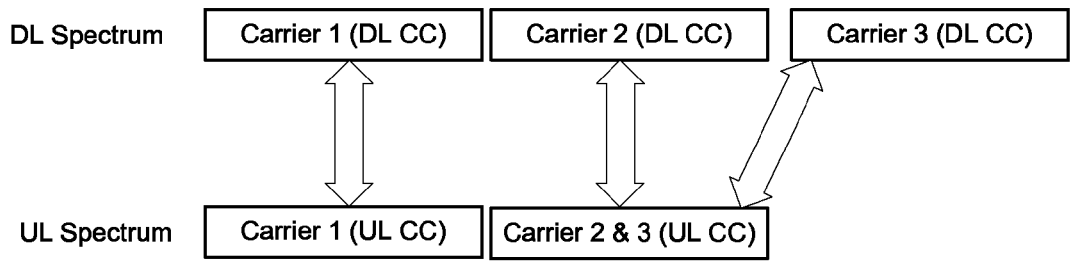
FIG. 4a illustrates pairing of uplinks and downlinks of component carriers for component carrier configuration in accordance with an example.
Figure 4B:
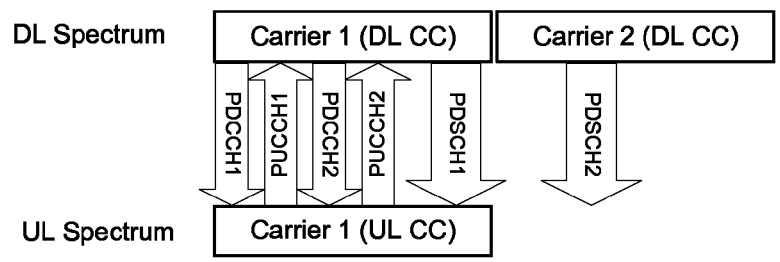
FIG. 4b illustrates asymmetric pairing with cross carrier allocation in accordance with an example.
Figure 4C:
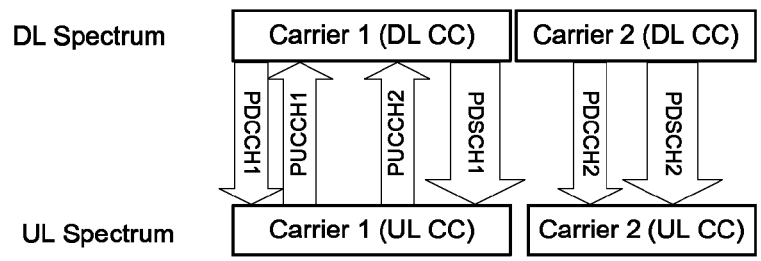
FIG. 4c illustrates asymmetric pairing without cross carrier allocation in accordance with an example.

FIGS. 4a-4c illustrate various examples of CC DL/UL pairings. In these examples, the carriers are assigned numbers to distinguish between the carriers. The numbering illustrated is for demonstration purposes only and is not intended to infer other types of numbering that may occur, such as the assigning of a carrier index value to each carrier of an eNode B.

In FIG. 4a, the ability to pair UL and DL flexibly is illustrated. For instance, the UL CC for carrier 1 is linked with the DL CC for carrier 1 to form a cell. Similarly, the UL CC for carrier 2 is linked with the DL CC for carrier 2 to form a cell. In another embodiment, the DL CC for carrier 3 is linked with the UL CC for carrier 2. Thus, this cell comprises an UL and a DL from two different carriers. The carriers may be adjacent, or may have center frequencies at different parts of the radio spectrum. The UL and DL may even be located in different frequency bands. The carriers may also be duplexed using different schemes, such as FDD or TDD.

FIG. 4b illustrates an example of asymmetric pairing with cross carrier allocation. The physical downlink control channel (PDCCH) and physical uplink control channel (PUCCH) for both carrier 1 and carrier 2 are allocated on carrier 1, while each DL CC supports its own physical downlink shared channel (PDSCH).

FIG. 4c illustrates an example of asymmetric pairing without cross carrier allocation. In the example of FIG. 4c, the PDCCH1 and the PUCCH1 are allocated on carrier 1. The PUCCH2 is allocated on the UL CC for carrier 1, while the PDCCH2 is allocated on the DL CC for carrier 2. As in FIG. 4b, each DL CC supports its own PDSCH. A variety of other types of asymmetric pairing are possible, either with or without cross carrier allocation, as can be appreciated.

A physical hybrid ARQ (Automatic Repeat request) indicator channel (PHICH) is a transmission channel that can carry information that confirms or requests the retransmission of blocks of data that were received incorrectly at the receiving device. For UL transmissions, the PHICH can be carried by the same carrier which contains the PDCCH for the corresponding UL grant.

UE specific pairing can be defined if it is different than the default pairing based on the 3GPP LTE Release 8/9 standards and reflected in the System Information Block (SIB) messaging. For each DL CC, the configuration defines the corresponding UL carrier.

In one embodiment, the configuration information for each CC can show:
    for each DL CC where the corresponding PUCCH is transmitted;
    for each DL CC, where the corresponding PDCCH is transmitted;
    for each UL CC where the corresponding PDCCH is transmitted; and
    for each UL CC for which the DL is the default DL CC, as defined in the 3GPP LTE Release 8/9 standards, whether the carrier includes any random access channel (RACH); the default can be that all RACH transmissions are carried on the PCC.

The PHICH can be sent on the same carrier where the PDCCH is transmitted for both the DL CC and the UL CC in the example in the preceding paragraph.

For each secondary component carrier (SCC), a DL configured carrier for a given UE can be linked to one UL configured carrier. The linking can apply for all UL control/feedback channel mechanisms including power control, PUCCH, RACH (if configured) and non-CIF scheduling.

Component Carrier Activation

Once a component carrier has been configured, activation of the configured carrier can be performed at the layer 2 (L2) layer. For example, activation may be performed using the media access control (MAC) layer through MAC control elements. Activation is a procedure that is typically used more frequently than configuration and less frequently than scheduling. There is little room for carrier aggregation specific information to be carried by MAC control elements during configuration, and even less room during scheduling. Therefore, only parameters which are least likely to be changed upon activation or scheduling are typically passed to the UE through configuration.

In one embodiment, deactivation of a carrier can be explicit and combined with activation of another carrier. An activated carrier may also be deactivated implicitly after no data is scheduled on that carrier for a predefined period of time. The predefined period of time can be set during the configuration/activation phase.

The activation information can include a list of configured CCs to be activated and a list of activated CCs to be deactivated. In one embodiment, the list can be implemented using a bitmap. The bitmap can comprise an ordered list in which each CC is assigned a location on the list. The location at which a CC is assigned on the list can be selected as desired. For instance, a CC may be assigned a location on the list based on the order in which the CC is activated, the CC's center frequency, the CC's carrier index (CI) value, or another process to assign a CC a unique location on the list. The activation or deactivation of a CC can then be carried out in a binary fashion by sending one binary number to represent "Activate" and another binary number to represent "deactivate".

For example, in carrier configuration each carrier can be assigned a carrier index value. An eNode B may have 5 configured carriers, with carrier index values 1, 2, 4, 8 and 9. The carriers can be assigned to a bitmap based on their carrier index value, with the lowest value listed first. A UE may be assigned carriers 1, 2, 4 and 9. The bitmap can be the same length as the number of carriers used by a UE. Thus, the bitmap for the UE is comprised of four binary numbers, with the value of each number selected to represent the state of the carrier. A bitmap of "1111" may represent activation of each carrier. A bitmap of "0000" may represent an explicit deactivation of each carrier. A bitmap value of "0101" may be used to activate carriers 1 and 4, while deactivating carriers 2 and 9 for the UE. Thus, the bitmap can be used to simultaneously turn on selected configured carriers while turning other carriers off. While the binary value "1" is represented to activate a carrier and the value "0" is represented to deactivate a carrier, this is not considered to be limitation. The opposite binary values may be used to represent activation and deactivation, as can be appreciated.

The use of a bitmap can significantly reduce overhead. Multiple bits are not needed to identify the carrier value and the desired state of the carrier. The UE and the eNode B merely need to both understand which position each carrier is assigned to in the bitmap. A single bit can then be transmitted to activate or deactivate a component carrier. In one embodiment, the single bit can be used to activate or deactivate a cell, comprising a UL CC and a DL CC. The UL CC and DL CC may be in different carriers.

In one embodiment, activation messages can be carried on the PCC and may also be sent on other carriers if they are configured to transmit PDCCH. A response to an activation message may be sent from the UE before activation takes effect and allows one or more carriers to be scheduled to carry data. An activation confirmation from the UE to the eNode B can also follow the same bitmap layout. The response can indicate which CCs have been successfully activated.

Once a CC has been activated at a UE, the UE can transmit a fast measurement of channel quality to the eNode B. For instance, a channel quality indicator (CQI) or other type of fast feedback channel can be communicated to the eNode B to indicate receive channel quality conditions on each carrier.

The activation process may be combined with the configuration process if all of the configured carriers need to be activated. In this embodiment, configuration may be deferred until the eNode B obtains sufficient measurements from the UE on the strength of available carriers to ensure that the candidate carrier is viable for activation before it is configured and activated.

Figure 5:
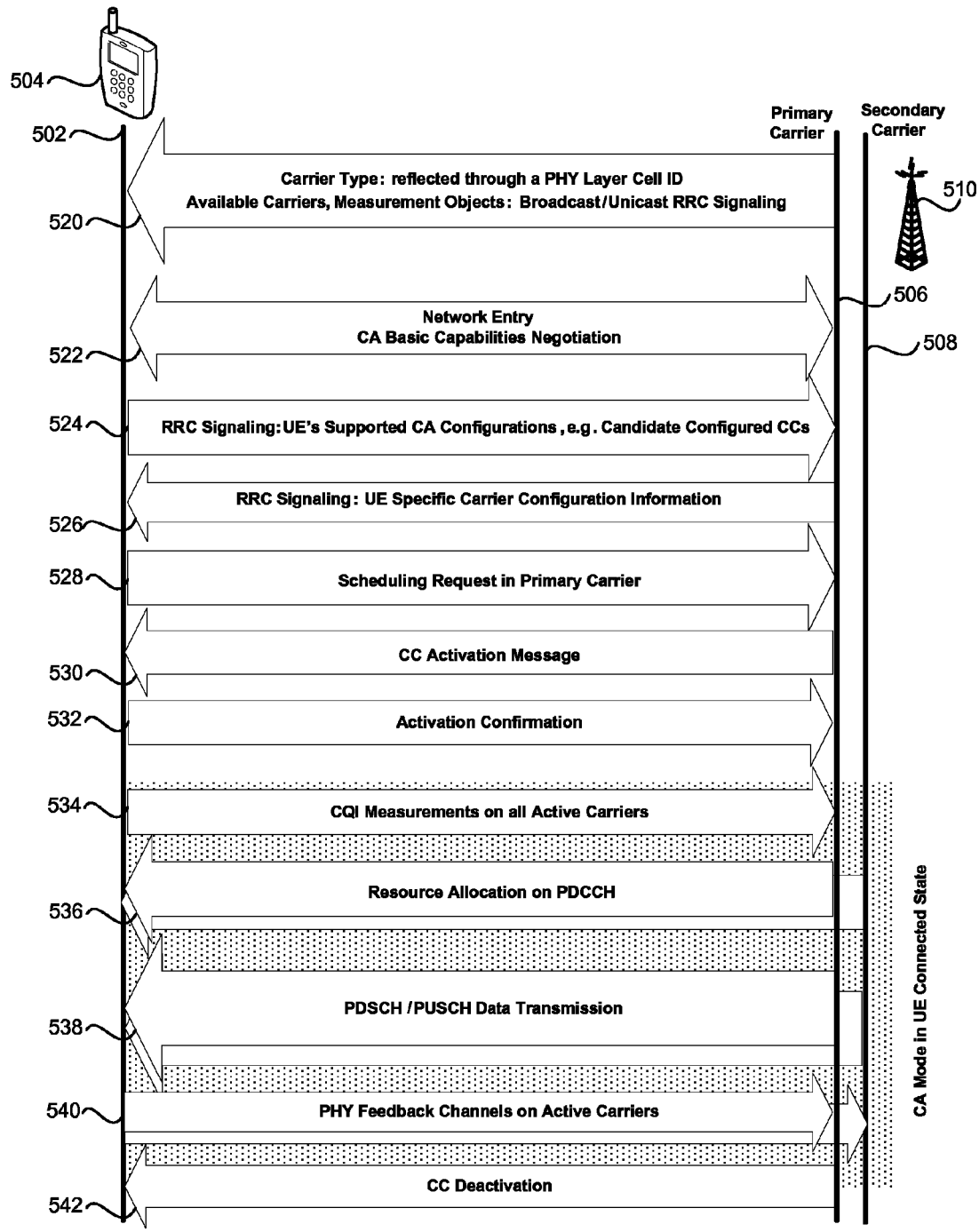
FIG. 5 illustrates a flow chart for carrier aggregation in accordance with an example.

FIG. 5 illustrates one example embodiment of a flow chart for carrier aggregation. The left line 502 represents communication to a UE 504. The first line on the right represents a primary component carrier (PCC) 506 at an eNode B 510. The second line on the right represents a secondary component carrier (SCC) 508 at the eNode B 510. The eNode B can include a plurality of different SCCs, as previously discussed.

When the UE 504 enters a network served by the eNode B 510, a communication 520 from the eNode B 510 can be sent to the UE identifying the available carriers in the network. The carrier selected by the UE for attachment to the eNode B can be considered the initial and default carrier, referred to as the Primary Component Carrier (PCC). All other carriers used by the eNode B are referred to as Secondary Component Carriers (SCC).

The UE and eNode B can then communicate 522 for network entry and negotiate the basic carrier aggregation capabilities of the UE. The UE can learn the types of carriers offered by the eNode B, including frequency, bandwidth, and frequency band of the component carriers. The UE can communicate its CA capabilities to the eNode B, including number of UL and DL CCs it can accept, the bandwidths of each UL and DL the UE is capable of receiving, and the frequency bands the UE is capable of operating in.

The UE 504 can then communicate 524 to the eNode B 510 using RRC signaling. The UE can communicate the UE's supported CA configurations. For instance, the candidate configured CCs.

The eNode B 510 can then communicate 526 to the UE specific carrier configuration information, including CIF allocation, DL/UL pairing information, PDCCH mapping information, PUCCH mapping, and so forth.

The UE 504 can then communicate 528 a scheduling request in the PCC. The scheduling request can occur as if the UE were operating in a single carrier mode without possible carrier aggregation. The eNode B can respond with a CC activation message 530. The CC activation message may be sent via MAC headers or in the DCI on the PDCCH of the PCC 506. As previously discussed, activation may include a bitmap showing which headers are to be activated and deactivated. An activation confirmation may optionally be communicated 532.

Upon activation, the UE 504 can communicate 534 with the eNode B on both the PCC 506 and at least one SCC 508.

The UE can provide CQI measurements for each active carrier to the eNode B. The CQI measurements may be sent via the PCC 506.

The eNode B 510 can communicate 536 resource allocation information on one or more PDCCHs using the PCC 506. Cross carrier allocation information can also be communicated using CIF. In one embodiment, the PDCCH and cross carrier allocation information may also be sent from one or more SCC 508. PDSCH and PUSCH data transmissions can be communicated 538 from the eNode B on the PCC and SCC(s) to the UE 504. The UE can communicate 540 physical feedback channels on active carriers (PCC and SCC). This is typically done only for downlink multiple-carrier allocations only.

Finally, CC deactivation messages can be communicated 542 from the eNode B 510 to the UE via the PCC 506. The deactivation messages may be explicit or implicit. For instance, a deactivation message may implicitly be communicated if an activated CC has not used in a set amount of time, such as two minutes.

The flow chart of FIG. 5 is one example of a process in which CCs can be configured and activated for carrier aggregation on a UE. The example is not intended to be limiting. The process may involve additional steps, and steps that occur in a different order than is listed in FIG. 5. In addition, each step listed in FIG. 5 may not be necessary each time a UE enters a network or is powered up.

Figure 6:
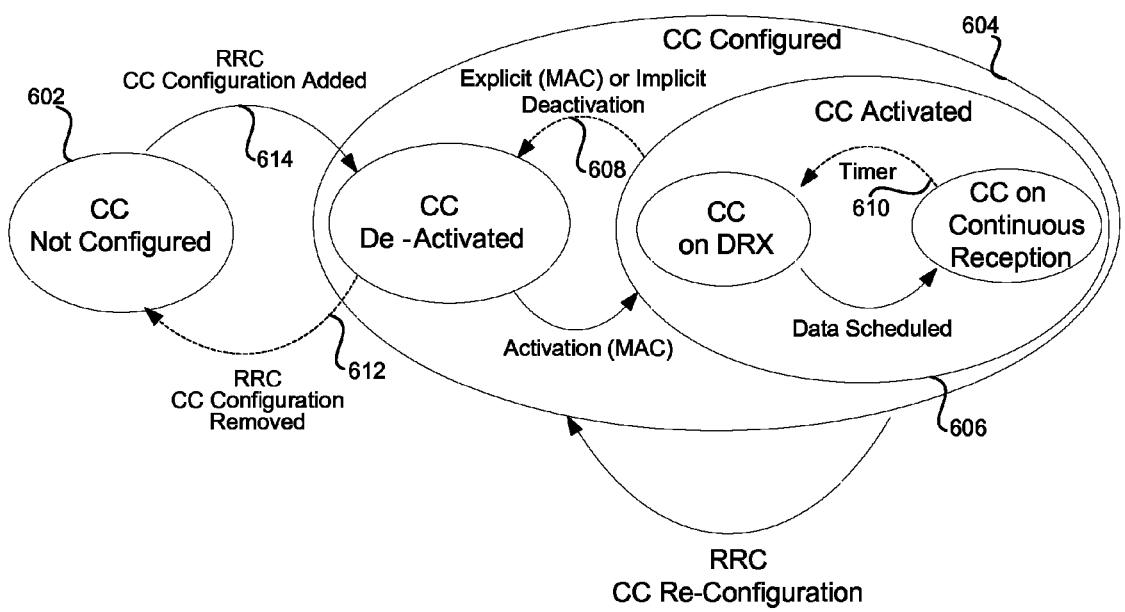
FIG. 6 illustrates a sequence of configuration, activation, and scheduling cycles for a component carrier involved in carrier aggregation in accordance with an example.

FIG. 6 provides an example of a sequence of configuration, activation, and scheduling cycles for a CC involved in carrier aggregation. When a UE first enters a network the CCs at an eNode B are not configured 602. Through RRC communication between the UE and the eNode B, and broadcasting from the eNode B, the CCs can be configured 604. Component carrier configuration information that is unique to a specific UE can be communicated via RRC signaling. Component carrier configuration information that is not unique can be broadcast by the eNode B to all of the UEs served by the eNode B.

Once the CCs have been configured, the eNode B can activate a CC for a specific UE based on the needs of the UE, such as Quality of Service (QoS), bandwidth, and so forth. If it is possible to meet the UE's communication needs using a single carrier, the eNode B may not assign additional carriers to the UE. However, if additional carriers need to be used to meet the communication needs of the UE then additional carriers can be assigned based on carrier measurements conducted by the UE for the eNode B's carriers. The carrier can then be activated 606 by the eNode B using L2 communication such as MAC.

The activated CC can remain activated until explicitly instructed to be deactivated 608 using L2 communication such as MAC. Alternatively the CC may remain activated until implicit deactivation occurs due to inactivity on the CC for a specific period of time 610. A deactivated CC can have its configuration removed 612, allowing the CC to be reconfigured using RRC signaling.

Figure 7:
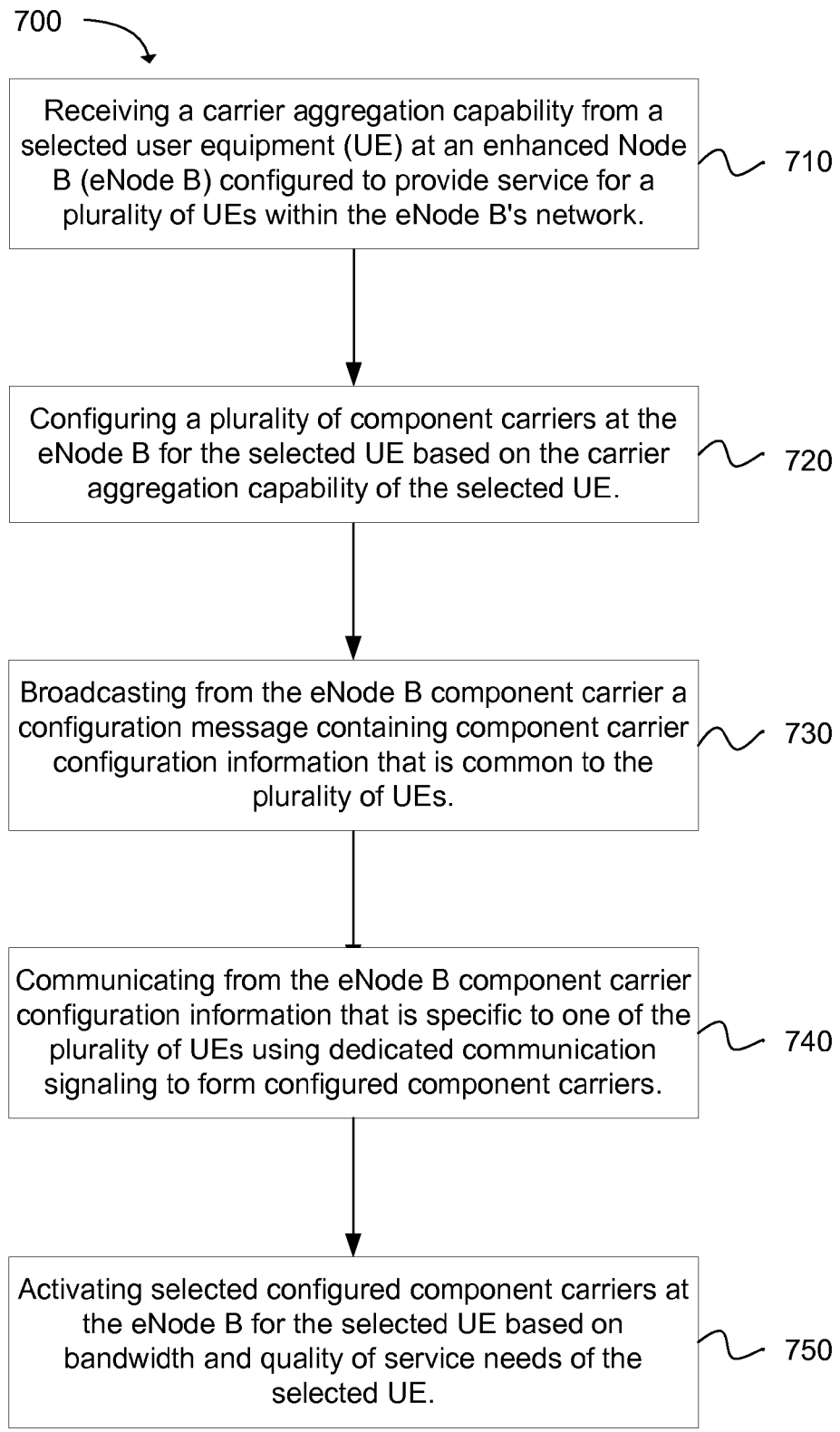
FIG. 7 depicts a flow chart of a method for configuring component carriers in carrier aggregation in accordance with an example.

In another embodiment, a method 700 for configuring component carriers in carrier aggregation is disclosed, as depicted in the flowchart of FIG. 7. The method comprises receiving 710 a carrier aggregation capability from a selected user equipment (UE) at an enhanced Node B (eNode B) configured to provide service for a plurality of UEs within the eNode B's network. A plurality of component carriers are configured 720 at the eNode B for the selected UE based on the carrier aggregation capability of the selected UE.

The method 700 further comprises broadcasting 730 from the eNode B component carrier a configuration message containing component carrier configuration information that is common to the plurality of UEs and communicating 740 from the eNode B component carrier configuration information that is specific to one of the plurality of UEs using dedicated communication signaling to form configured component carriers. The dedicated communication signaling can be RRC signaling from the eNode B to the selected UE for each component carrier.

The configuration information that is broadcast for each component carrier can include the component carrier's center frequency, bandwidth, and duplex mode, such as TDD or FDD. This configuration information may be further defined for an uplink (UL) and downlink (DL) for each CC. The broadcast configuration message can also include an eNode B specific carrier index. The dedicated communication signaling can include a UE specific configured physical carrier index provided in the dedicated communication signaling. Use of the eNode specific and UE specific carrier index values can reduce overhead when referencing each component carrier in communication between the eNode B and the plurality of UEs.

The method further comprises activating 750 selected configured component carriers at the eNode B for the selected UE based on bandwidth and quality of service needs of the selected UE.

The method 700 can also include reporting radio resource management (RRM) measurements of signal strength from each of the plurality of UEs to the eNode B for a plurality of component carriers available for carrier aggregation that are provided by the eNode B. The operation of activating selected configured component carriers at the eNode B for the selected UE can further comprise activating the selected configured components based on the RRM measurements provided by the selected UE following configuration.

The operation of communicating the selected UE's carrier aggregation capability can further comprise communicating from the selected UE at least one of a maximum number of component carriers supported for an uplink to the eNode B, a maximum number of component carriers supported for a downlink from the eNode B, a maximum bandwidth supported for the uplink and the downlink, and support of selected frequency bands.

The method 700 can further comprise attaching the selected UE to one of the component carriers and defining the component carrier as a primary component carrier. A downlink of the PCC and be selected to carry downlink control information (DCI) on a physical downlink control channel (PDCCH) for the plurality of component carriers. In another embodiment, a downlink component carrier of the plurality of component carriers can be selected to carry DCI on the PDCCH for the plurality of component carriers.

The method 700 can further comprise selecting an uplink component carrier for each downlink component carrier to carry physical uplink shared channel (PUSCH) and uplink feedback information on a physical uplink control channel (PUCCH). The uplink component carrier can be paired as part of carrier configuration with the downlink component carrier that is also carrying corresponding uplink assignments in the PDCCH. An uplink component carrier of the PCC can be selected to carry feedback information for each physical downlink shared channel (PDSCH) transmission on each downlink component carrier for the plurality of component carriers. A physical hybrid ARQ (Automatic Repeat request) indicator channel (PHICH) can be carried on the same component carrier used to carry a PDCCH.

Activating the selected configured component carriers can further comprise transmitting activation information as a media access control (MAC) control element from the eNode B to the selected UE for each component carrier. Activating and deactivating each component carrier for the selected UE can be accomplished using a bitmap transmitted from the eNode B to the UE. Bits in the bitmap can be mapped to an ordered list of indexes for the plurality of component carriers. A "1" value can be transmitted to activate a component carrier and a "0" value can be transmitted to deactivate a component carrier. Alternatively, the opposite binary values may also be used, as can be appreciated. Activated component carriers can also be deactivated based on selected deactivation rules. The deactivation rules can include the amount of time a carrier has not been used to transmit data to a UE. After a selected amount of time, the component carrier may be deactivated if it has not been used. Other rules can also be applied, as can be appreciated.

Figure 8:
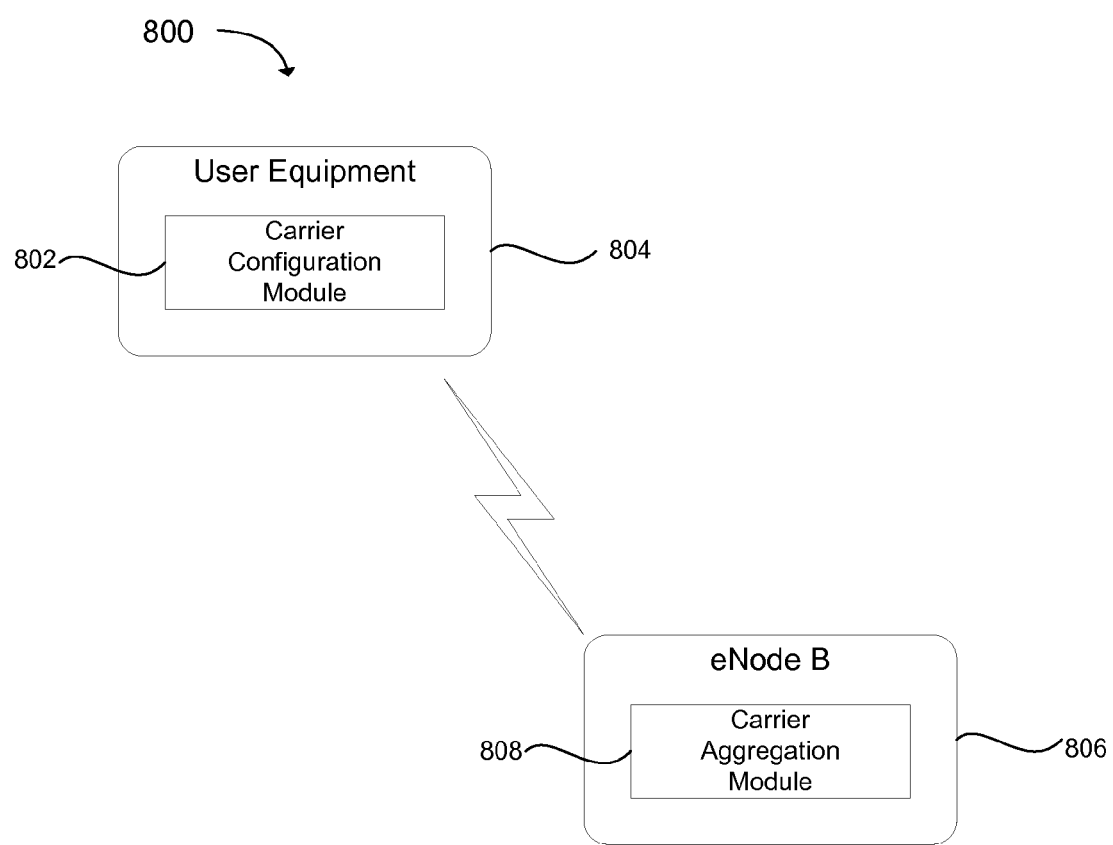
FIG. 8 depicts a flow chart of a system for configuring component carriers in carrier aggregation in accordance with an example.

In another embodiment, a system 800 for configuring component carriers in carrier aggregation is disclosed, as depicted in the block diagram of FIG. 8. The system comprises a carrier aggregation module 808 operating at an enhanced Node B (eNode B) that is configured to provide service for a plurality of UEs. The eNode B is configured to receive a carrier aggregation capability from a carrier configuration module 802 operating at a selected user equipment (UE).

The carrier aggregation module operating at the eNode B is operable to configure a plurality of component carriers at the eNode B for the selected UE based on the carrier aggregation capability of the selected UE and broadcast from the eNode B a component carrier configuration message containing component carrier configuration information that is common to the plurality of UEs. For eNode B component carrier configuration information that is specific to the selected UE, the eNode B can communicate (i.e. unicast) the specific component carrier information to the selected UE. For instance, dedicated communication signaling may be used. The module 808 is further configured to activate selected configured component carriers at the eNode B for the selected UE based on at least one of quality of service needs and bandwidth of the selected UE.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Various techniques, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for configuring component carriers in carrier aggregation, comprising:
   receiving a carrier aggregation capability message from a selected user equipment (UE) at an enhanced Node B (eNode B) configured to provide service for a plurality of UEs within the eNode B's network, wherein the carrier aggregation capability message includes a plurality of carrier aggregation capabilities of the UE;
   configuring a plurality of component carriers at the eNode B for the selected UE based on the carrier aggregation capability message of the selected UE;
   broadcasting from the eNode B a component carrier configuration message containing component carrier configuration information that is common to the plurality of UEs;
   communicating from the eNode B component carrier configuration information that is specific to one of the plurality of UEs using dedicated communication signaling to form configured component carriers; and
   activating or deactivating selected configured component carriers at the eNode B for the selected UE based on bandwidth and quality of service needs of the selected UE, wherein the selected configured component carriers are activated or deactivated by transmitting a bitmap from the eNodeB to the UE that includes bits to indicate the selected configured component carriers that are activated or deactivated, wherein the selected component carriers are deactivated based on selected deactivated rules, wherein the selected deactivation rules include at least a predetermined time period a selected component carrier has not be used to transmit data to the selected UE.

2. The method of claim 1, further comprising:
   receiving radio resource management (RRM) measurements of signal strength from each of the plurality of UEs at the eNode B for a plurality of component carriers available for carrier aggregation that are provided by the eNode B.

3. The method of claim 2, wherein reporting RRM measurements of signal strength further comprises measuring signal strength of each component carrier at each of the plurality of UEs using at least one of Reference Symbol Received Power (RSRP), Reference Symbol Received Quality (RSSQ), and Carrier Received Signal Strength Indicator (RSSI) communicated via RRC signaling.

4. The method of claim 2, wherein activating selected configured component carriers at the eNode B further comprises activating selected configured component carriers at the eNode B for the selected UE based on the RRM measurements provided by the selected UE following configuration.

5. The method of claim 1, wherein receiving the carrier aggregation's capability further comprises receiving at the eNode B from the selected UE at least one of a maximum number of component carriers supported for an uplink to the eNode B, a maximum number of component carriers supported for a downlink from the eNode B, a maximum bandwidth supported for the uplink and the downlink, and support of selected frequency bands.

6. The method of claim 1, further comprising broadcasting component carrier configuration information from the eNode B for each component carrier including:
   carrier center frequency, carrier bandwidth, and carrier duplex mode.

7. The method of claim 1, further comprising assigning each component carrier at the eNode B:
   an eNode B specific carrier index (CI) provided in the broadcast configuration message; and
   a UE specific configured physical carrier index provided in the dedicated communication signaling to reduce overhead when referencing each component carrier in communication between the eNode B and the plurality of UEs.

8. The method of claim 1, further comprising attaching the selected UE to one of the component carriers and defining the component carrier as a primary component carrier (PCC).

9. The method of claim 8, further comprising selecting a downlink of the PCC to carry downlink control information (DCI) on a physical downlink control channel (PDCCH) for the plurality of component carriers.

10. The method of claim 1, further comprising selecting a downlink component carrier of the plurality of component carriers to carry downlink control information (DCI) on a physical downlink control channel (PDCCH) for the plurality of component carriers.

11. The method of claim 1, further comprising selecting an uplink component carrier for each downlink component carrier to carry physical uplink shared channel (PUSCH) and uplink feedback information on a physical uplink control channel (PUCCH), wherein the uplink component carrier is paired as part of carrier configuration with the downlink component carrier that is also carrying corresponding uplink assignments in the PDCCH.

12. The method of claim 8, further comprising selecting an uplink component carrier of the PCC to carry feedback information for each physical downlink shared channel (PDSCH) transmission on each downlink component carrier for the plurality of component carriers.

13. The method of claim 1, further comprising carrying a physical hybrid ARQ (Automatic Repeat request) indicator channel (PHICH) on a same component carrier used to carry a physical downlink control channel.

14. The method of claim 1, wherein communicating from the eNode B further comprises identifying in the component carrier configuration information:
   for each downlink component carrier where a corresponding physical uplink control channel is transmitted;
   for each down link component carrier where a corresponding physical downlink control channel is transmitted;
   for each uplink component carrier, where a corresponding physical downlink control channel is transmitted; and
   for a primary component carrier, whether a random access channel is included.

15. The method of claim 1, wherein activating the selected configured component carriers further comprises transmitting activation information as a media access control (MAC) control element from the eNode B to the selected UE for each component carrier.

16. The method of claim 1, wherein bits in the bitmap are mapped to an ordered list of indexes for the plurality of component carriers.

17. The method of claim 16, further comprising transmitting one of a "1" and a "0" value at each bit in the bitmap to indicate one of activation and deactivation of the component carrier.

18. A system for configuring component carriers in carrier aggregation, comprising:
   a carrier aggregation module operating at an enhanced Node B (eNode B) configured to provide service for a plurality of UEs, the carrier aggregation module configured to:

receive a carrier aggregation capability message at the eNode B from a carrier configuration module operating at a selected UE, wherein the carrier aggregation capability message includes a plurality of carrier aggregation capabilities of the selected UE;

configure a plurality of component carriers at the eNode B for the selected UE based on the carrier aggregation capability message of the selected UE;

broadcast from the eNode B a component carrier configuration message containing component carrier configuration information that is common to the plurality of UEs;

unicast from the eNode B to the selected UE component carrier configuration information that is specific to the selected UE; and activate or deactivate selected configured component carriers at the eNode B for the selected UE based on at least one of quality of service needs and bandwidth needs of the selected UE, wherein the selected configured component carriers are activated or deactivated by transmitting a bitmap from the eNodeB to the UE that includes bits to indicate the selected configured component carriers that are activated or deactivated, wherein the selected configured component carriers are deactivated based on selected deactivation rules, wherein the selected deactivation rules include at least a predetermined time period a selected configured component carrier has not be used to transmit data to the selected UE.

19. The system of claim 18, wherein the carrier aggregation module at the eNode B is further configured to receive radio resource management (RRM) measurements of signal strength from each of the plurality of UEs for the plurality of component carriers available for carrier aggregation at the eNode B.

20. The system of claim 18, wherein the carrier aggregation module at the eNode B is further configured to communicate from the eNode B to the selected UE the component carrier configuration information that is specific to the selected UE using level 2 communication.

21. The system of claim 18, wherein bits in the bitmap are mapped to an ordered list of indexes for the plurality of component carriers.

22. A computer program product, comprising a computer usable medium having a computer readable program code embodied therein, the computer readable program code adapted to be executed to implement a method for configuring component carriers in carrier aggregation, comprising:

receiving a carrier aggregation capability message from a selected UE at an enhanced Node B (eNode B) configured to provide service for a plurality of UEs, wherein the carrier aggregation capability message includes a plurality of carrier aggregation capabilities of the selected UE;

configuring a plurality of component carriers at the eNode B for the selected UE based on the carrier aggregation capability message of the selected UE;

broadcasting from the eNode B a component carrier configuration message containing component carrier configuration information that is common to the plurality of UEs;

communicating from the eNode B component carrier configuration information that is specific to the selected UE using dedicated communication signaling;

receiving radio resource management (RRIVI) measurements of signal strength from each of the plurality of UEs at the eNode B; and activating or deactivating selected configured component carriers from the eNode B for the selected UE based on the signal strength measurements, wherein the selected configured component carriers are activated or deactivated by transmitting a bitmap from the eNodeB to the UE that includes bits to indicate the selected configured component carriers that are activated or deactivated, wherein the selected configured component carriers are deactivated based on selected deactivation rules, wherein the selected deactivation rules include at least a predetermined time period a selected configured component carrier has not be used to transmit data to the selected UE.

23. The method of claim 22, wherein receiving the carrier aggregation capability further comprises receiving at the eNode B from the selected UE at least one of a maximum number of component carriers supported for an uplink to the eNode B, a maximum number of component carriers supported for a downlink from the eNode B, a maximum bandwidth supported for the uplink and the downlink, and support of selected frequency bands.

24. The method of claim 22, further comprising broadcasting from the eNode B component carrier configuration information for each component carrier, the component carrier configuration information including: a carrier center frequency of each component carrier, a carrier bandwidth of each component carrier, and a carrier duplex mode of an uplink and a downlink of each component carrier.

25. The method of claim 22, wherein bits in the bitmap are mapped to an ordered list of indexes for the plurality of component carriers.

* * * * *